United States Patent [19]
Gellert

[11] Patent Number: 5,474,440
[45] Date of Patent: Dec. 12, 1995

[54] INJECTION MOLDING NOZZLE WITH COLLAR HAVING LOCATING AND RETAINING LUG PORTIONS

[76] Inventor: Jobst U. Gellert, 7A Prince St., Georgetown, Ontario, Canada, L7G 2X1

[21] Appl. No.: 312,535

[22] Filed: Sep. 26, 1994

[51] Int. Cl.⁶ .................................................. B29C 45/20
[52] U.S. Cl. ..................... 425/549; 264/328.15
[58] Field of Search ......................... 425/549; 264/328.15

[56]  References Cited

U.S. PATENT DOCUMENTS 4,403,405  9/1983  Gellert .
5,028,227  7/1991  Gellert et al. ............................ 425/549

*Primary Examiner*—Tim Heitbrink
*Attorney, Agent, or Firm*—Dalesman & Company

[57]  ABSTRACT

An injection molding nozzle to be seated in an opening in a mold with an outer collar extending around an elongated central body. The outer collar is made up of two removable semicircular segments which interlock with the central body. Each of the semicircular segments of the collar have a pair of spaced locating and retaining lug portions which extend outwardly to a longitudinal ridge. This provides sufficient thickness for a threaded hole at each lug portion to receive a screw to tighten the rear end of the nozzle securely against a melt distribution manifold. The ridges of the lug portions fit in contact in the opening in the mold to precisely locate the rear end of the nozzle and retain the two semicircular segments in the interlocking position.

6 Claims, 3 Drawing Sheets

5,474,440

INJECTION MOLDING NOZZLE WITH COLLAR HAVING LOCATING AND RETAINING LUG PORTIONS

BACKGROUND OF THE INVENTION

This invention relates generally to injection molding and more particularly to an injection molding nozzle with an outer collar having two segments with locating and retaining lug portions.

Heated injection molding nozzles for conveying thermoplastic materials to a cavity in a cooled mold are well known. More recently, as seen in the applicant's Canadian Patent Application Serial Number 2,127,210 filed Jun. 30, 1994 entitled "Injection Molding Nozzle with Helical Cooling Conduit" the nozzle is cooled to convey thermosetting material to a cavity in a heated mold. In the past, as seen in the applicant's U.S. Pat. No. 4,403,405 which issued Sep. 13, 1983, these nozzles have been made with a single piece outer collar integrally brazed around an elongated central portion. More recently, the applicant's Canadian Patent Application Serial Number 2,127,211 filed Jun. 30, 1994 entitled "Injection Molding Nozzle with Removable Collar Portion" shows a nozzle with a removable outer collar having two segments which are retained in an interlocking position around a central body by a retaining ring. While this is a significant improvement which is satisfactory for many applications, it has the disadvantage that the nozzle is not adequately located and secured in place for some applications.

SUMMARY OF THE INVENTION

Accordingly, it is an object of the present invention to at least partially overcome the disadvantages of the prior art by providing an injection molding nozzle with an outer collar having two self-retaining segments which also securely locate the nozzle in place.

To this end, in one of its aspects, the invention provides an injection molding nozzle to be seated in an opening in a mold with an insulative air space extending between the nozzle and the mold, the opening in the mold having a rear portion with a generally cylindrical surface, the nozzle having a rear end, a front end, and a melt channel extending therethrough from the rear end to convey melt forwardly toward at least one gate extending through the mold to a cavity, the nozzle having an elongated central body and a two-segment outer collar, the outer collar extending around the central body adjacent the rear end of the nozzle and comprising two separate segments which are received around the elongated central body in a position interlocking with the elongated central body to prevent longitudinal movement of the elongated central body relative to the outer collar, the improvement wherein the two segments of the outer collar of the nozzle have a plurality of locating and retaining lug portions spaced therearound, each locating and retaining lug portion to extend adjacent the rear end of the nozzle outwardly across the insulative air space into locating contact against the surrounding generally cylindrical surface of the rear portion of the opening in the mold to retain the two segments of the outer collar in the interlocking position around the central body of the nozzle.

Further objects and advantages of the invention will appear from the following description taken together with the accompanying drawings.

DETAILED DESCRIPTION OF THE INVENTION

Figure 1:
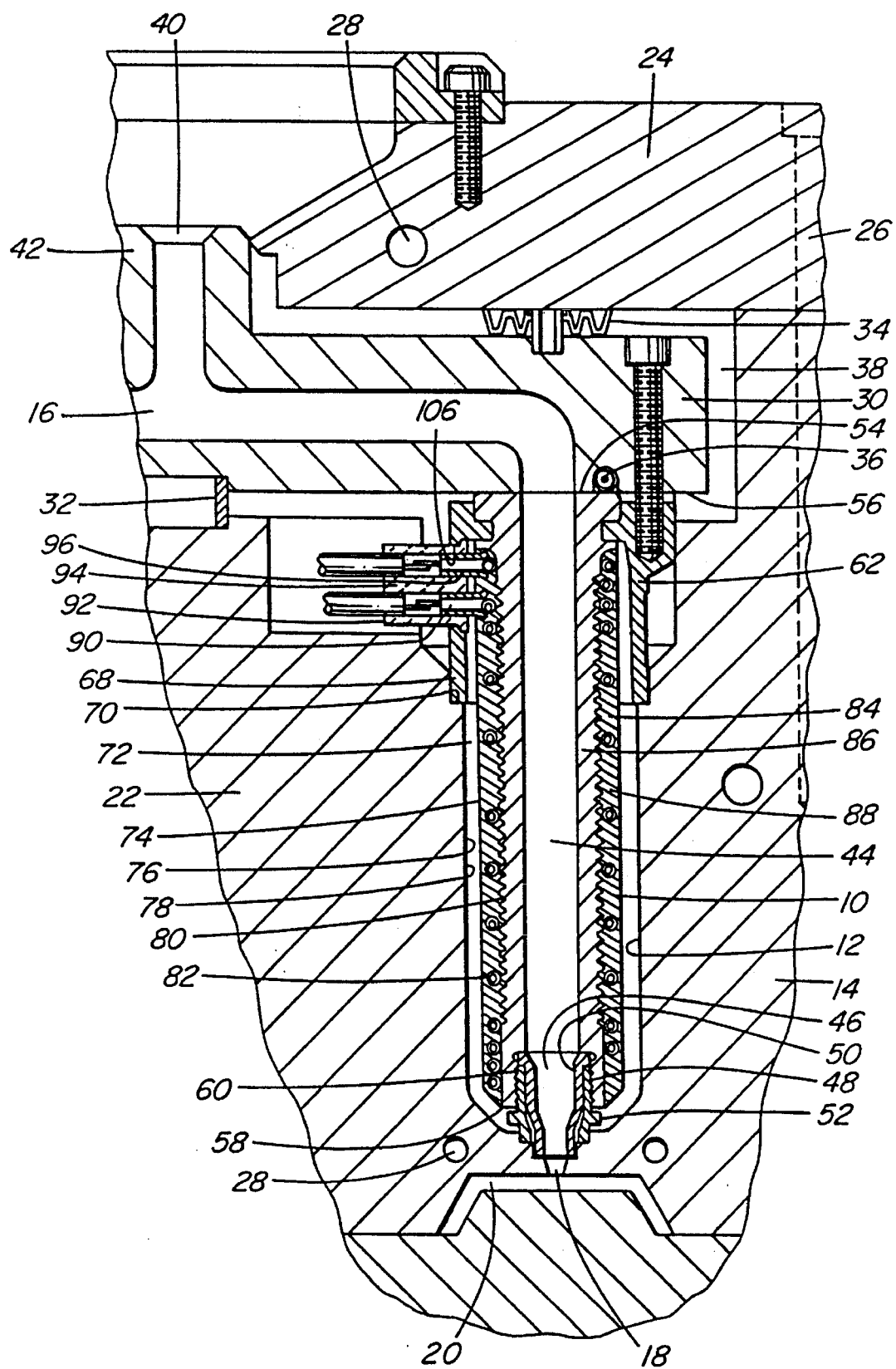
FIG. 1 is a sectional view of a portion of a multi-cavity injection molding system showing a nozzle according to a preferred embodiment of the invention.

Reference is first made to FIG. 1 which shows a portion of a multi-cavity injection molding system or apparatus in which several steel nozzles 10 are seated in openings 12 in a mold 14 to convey pressurized plastic melt through a melt passage 16 to respective gates 18 leading to different cavities 20 in the mold 14. While the mold 14 usually has a greater number of plates depending upon the configuration, in this case only a cavity plate 22 and back plate 24 which are secured together by bolts 26 are shown for ease of illustration. The mold 14 is cooled by pumping cooling water through cooling conduits 28 in the cavity plate 22 and back plate 24.

The nozzles 10 are interconnected by a steel melt distribution manifold 30 which is mounted between the cavity plate 22 and the back plate 24 by a central locating ring 32 and insulative and resilient spacer members 34. The melt distribution manifold 30 is heated by an integral electrical heating element 36 and an insulative air space 38 is provided between it and the surrounding cooled cavity plate 22 and back plate 24. The melt passage 16 receives melt through a central inlet 40 in cylindrical inlet portion 42 of the manifold 30 and branches out in the manifold 30 to pass through a central melt channel 44 in each of the nozzles 10. The melt then flows through an aligned melt duct 46 in a nozzle seal 48 having a hollow inner piece 50 and a threaded outer piece 52 to the gate 18.

Each nozzle 10 has a rear end 54 which abuts against the front face 56 of the manifold 30 and a front end 58 with a threaded seat 60 in which the two-piece nozzle seal 48 is seated. Next to the rear end 54, the nozzle 10 has an outer collar 62 with two separate steel segments or semicircular halves 64 extending around an elongated central body 66 through which the central melt channel 44 extends. The nozzle 10 is seated in the opening 12 in the mold 14 by a forwardly extending flange portion 68 of the outer collar 62 sitting on a circular seat 70 in the opening 12 to provide an insulative air space 72 between the outer surface 74 of the nozzle 10 and the surrounding inner surface 76 of the forward portion 78 of the opening 12 in the mold 14. In this embodiment, the central body 66 of the nozzle is made with an electrical heating element 80 having a helical portion 82 cast into a copper alloy conductive portion 84 around a hot-work steel hollow core 86. The hollow core 86 has a threaded outer surface 88 to ensure the copper alloy conductive portion 84 can be securely cast around it. The helical portion 82 of the heating element 80 is generally wound with its coils closer together near the rear and front ends 54, 58 of the nozzle 10 where there is more heat loss. The electrical heating element 80 has lead portions 90 which extend outwardly to an external terminal 92 formed by a ceramic insulative connector 94. Each of the lead portions 90 extends through a stainless steel protective tube 96 which has its inner end 98 rigidly cast in the copper alloy conductive portion 84 around the hollow core 86.

Figure 2:
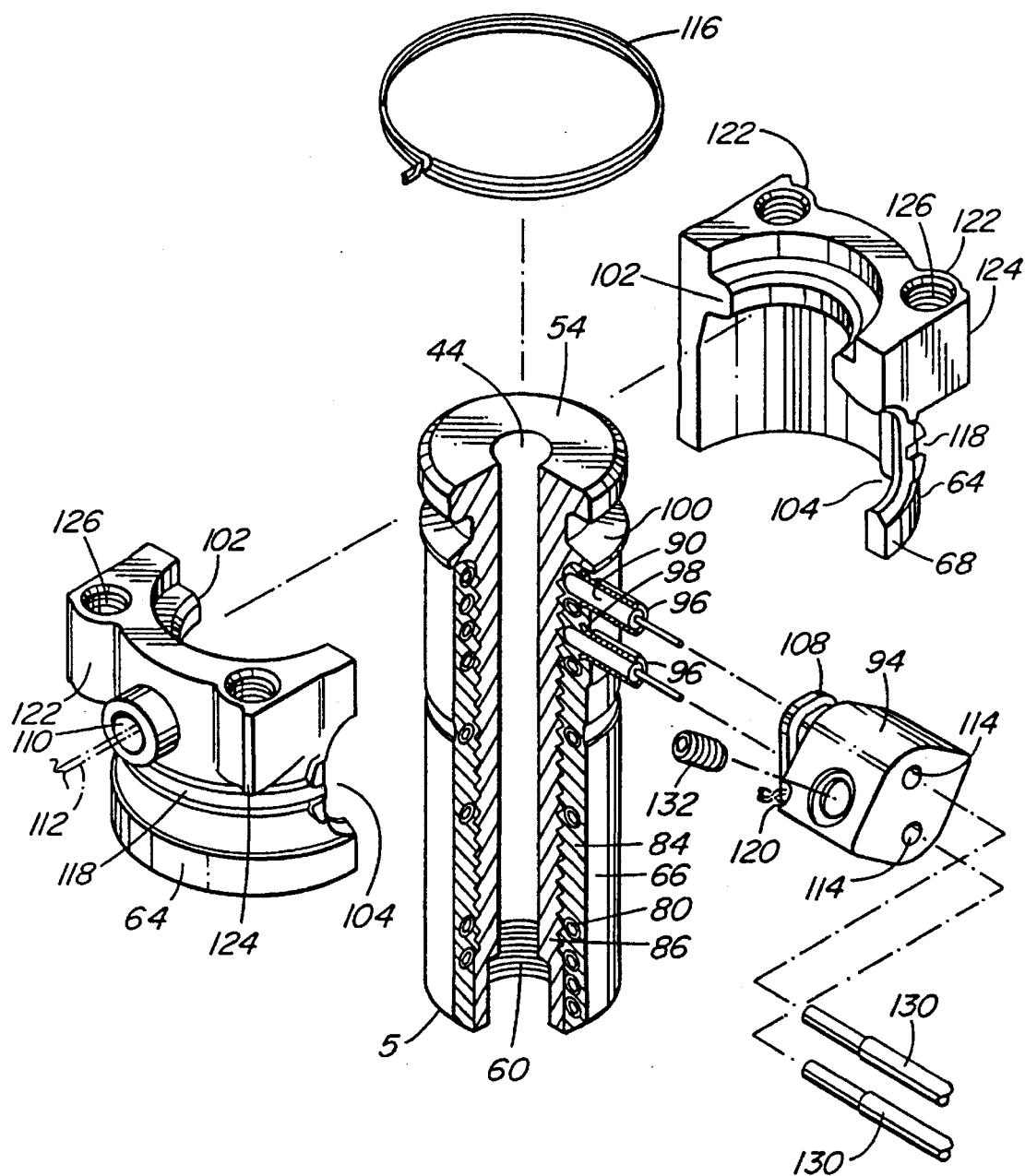
FIG. 2 is an exploded isometric view of the nozzle seen in FIG. 1 showing how it is made.

As is best seen in FIG. 2, a circular channel 100 with a rectangular cross-section extends around the elongated central body 66 of the nozzle 10 near its rear end 54. The two semicircular segments 64 of the outer collar 62 each have a matching flange 102 which fit into the circular channel 100 in the central body 66 in an interlocking position preventing longitudinal movement of the central body 66 relative to the outer collar 62. The semicircular segments 64 each have a matching notch 104 in one end which combine to form a radial opening 106 when the semicircular segments 64 are mounted in this interlocking position around the central body 66. The radial opening 106 is undercut to retainably receive a matching tapered inner end portion 108 of the insulative connector 94. The two matching semicircular segments 64 are generally the same size and shape, and both of them are shown having a radial thermocouple hole 110 to receive a thermocouple element 112 to monitor the operating temperature.

Figure 3:
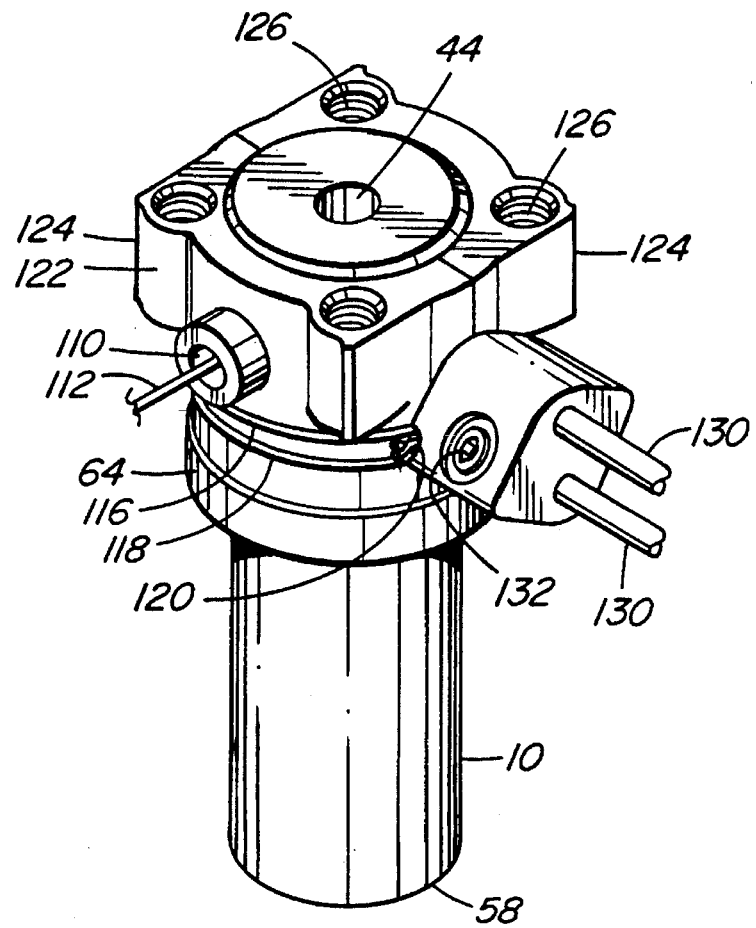
FIG. 3 is an isometric view of the nozzle assembled in the interlocking position.

While the central body 66 is shown having a predetermined length and a threaded seat 60 in the front end 58 to receive the two-piece nozzle seal 48, in other embodiments it can have a different length or a different configuration for different types of gating. After selecting an appropriate central body 66, a standard ceramic insulative connector 94 is mounted on it with the protective tubes 96 received in a pair of holes 114 in the insulative connector 94. The two semicircular segments 64 of the outer collar 62 are then mounted in the interlocking position around the central body 66 with the inwardly projecting flanges 102 received in the circular channel 100 and the inner end portion 108 of the ceramic insulative connector 94 securely received in the radial opening 106. A retaining wire 116 is then wound in a circular groove 118 extending around the two semicircular segments 64 and through a transverse hole 120 through the insulative connector 94 to secure them together as seen in FIG. 3 during shipping and installation.

Figure 4:
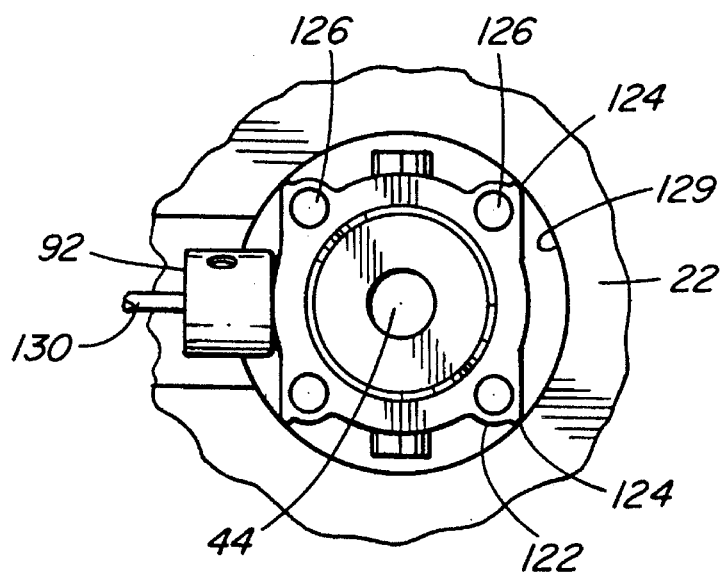
FIG. 4 is a plan view of the assembled nozzle seated in the mold.

In this embodiment, each of the semicircular segments 64 has a pair of locating and retaining lug portions 122 spaced therearound. Each lug portion 122 extends outwardly to an outer longitudinal ridge 124 and provide sufficient thickness for a threaded hole 126 also extending longitudinally partially in each lug portion 122. As seen in FIG. 1, during installation in the mold 14 screws 128 are tightened into the holes 126 from the manifold 30 to secure the rear end 54 of the nozzle 10 against the front face 56 of the manifold 30 to prevent melt seeping between them, particularly during start-up. When the nozzle 10 is installed in the opening 12 in the mold 14, as seen in FIG. 4, the outer ridges 124 of the locating and retaining lug portions 122 fit in contact against the inner surface 129 of the opening 12. This precisely locates the rear end 54 of the nozzle 10 and prevents it tilting slightly on the circular seat 70 due to thermal expansion of the melt distribution manifold 30 and also securely retains the semicircular segments 64 in the interlocking position. Electrical power wires 130 from an electrical power source are connected to the lead portions 90 of the electrical heating element 80 by set screws 132 which are screwed into the ceramic insulative connector 94.

In use, after assembly and installation in a mold 14, as shown in FIG. 1, electrical power is applied to the heating element 36 in the manifold 30 and to the heating elements 80 in the nozzles 10 to heat them to a predetermined operating temperature. Pressurized melt is applied from a molding machine (not shown) to the central inlet 40 of the melt passage 16 according to a predetermined cycle. The melt flows through the melt distribution manifold 30, nozzles 10, nozzle seals 48, and gates 18 into the cavities 20. After the cavities 20 are filled and a suitable packing and cooling period has expired, the injection pressure is released and the melt conveying system is decompressed to avoid stringing through the open gates 18. The mold 14 is then opened to eject the molded products. After ejection, the mold 14 is closed and the cycle is repeated continuously with a cycle time dependent upon the size of the cavities 20 and the type of material being molded.

While the description of the nozzle 10 with the outer collar 62 having two segments 64 with locating and retaining lug portions 122 according to the invention has been given with respect to a preferred embodiment, it will be evident that various other modifications are possible without departing from the scope of the invention as understood by those skilled in the art and as defined in the following claims. For instance, rather than being heated and seated in a cooled mold 14, the nozzles 10 can be cooled and seated in a heated mold for molding thermosetting materials.

The embodiments of the invention in which an exclusive property or privilege is claimed are defined as follows:

1. In an injection molding nozzle to be seated in an opening in a mold with an insulative air space extending between the nozzle and the mold, the opening in the mold having a rear portion with a generally cylindrical surface, the nozzle having a rear end, a front end, and a melt channel extending therethrough from the rear end to convey melt forwardly toward at least one gate extending through the mold to a cavity, the nozzle having an elongated central body and a two-segment outer collar, the outer collar extending around the central body adjacent the rear end of the nozzle and comprising two separate segments which are received around the elongated central body in a position interlocking with the elongated central body to prevent longitudinal movement of the elongated central body relative to the outer collar, the improvement wherein;

the two segments of the outer collar of the nozzle have a plurality of locating and retaining lug portions spaced therearound, each locating and retaining lug portion to extend adjacent the rear end of the nozzle outwardly across the insulative air space into locating contact against the surrounding generally cylindrical surface of the rear portion of the opening in the mold, whereby the two segments of the outer collar fit in the opening in the mold and are retained in the interlocking position around the central body of the nozzle.

2. An injection molding nozzle as claimed in claim 1 wherein each locating and retaining lug portion forms an outer longitudinal ridge to extend into contact against the generally cylindrical surface of the rear portion of the opening in the mold.

3. An injection molding nozzle as claimed in claim 2 to be seated in the opening in the mold with the rear end of the nozzle abutting against the front face of a melt distribution manifold, wherein the two segments of the outer collar of the nozzle have a plurality of threaded holes extending longitudinally thereinto from the rear end of the nozzle, each threaded hole extending at least partially in a respective one of the retaining and locating lug portions, the threaded holes to receive screws extending forwardly from the melt distribution manifold to secure the rear end of the nozzle tightly against the front face of the melt distribution manifold.

4. An injection molding nozzle as claimed in claim 3 wherein each segment of the outer collar of the nozzle has at least two of said threaded holes extending thereinto.

5. An injection molding nozzle as claimed in claim 3 wherein one of the elongated central body and the outer collar has a circular channel extending therearound and the other of the elongated central body and the outer collar has a circular flange extending therearound which is seated in the circular channel in the interlocking position.

6. An injection molding nozzle as claimed in claim 5 wherein the nozzle is heated by an electrical heating element having a helical portion extending around the melt channel in the elongated central body.

* * * * *